US008621423B2

(12) United States Patent
Knight et al.

(10) Patent No.: US 8,621,423 B2
(45) Date of Patent: Dec. 31, 2013

(54) METHOD OF AUTOMATICALLY BUILDING A CUSTOMISED SOFTWARE APPLICATION FOR A SPECIFIC TYPE OF WIRELESS COMPUTING DEVICE

(75) Inventors: Mark Stephen Knight, London (GB); Michael Ian Lamb, London (GB); Robert John Lewis, London (GB); Stephen William Pocock, Egham (GB); Philip Anthony Sant, London (GB); Mark Peter Sullivan, Birmingham (GB)

(73) Assignee: Omnifone Limited, London (GB)

( * ) Notice: Subject to any disclaimer, the term of this patent is extended or adjusted under 35 U.S.C. 154(b) by 1478 days.

(21) Appl. No.: 11/720,904

(22) PCT Filed: Dec. 6, 2005

(86) PCT No.: PCT/GB2005/004675
§ 371 (c)(1),
(2), (4) Date: Jul. 27, 2007

(87) PCT Pub. No.: WO2006/061595
PCT Pub. Date: Jun. 15, 2006

(65) Prior Publication Data
US 2008/0222621 A1 Sep. 11, 2008

(30) Foreign Application Priority Data
Dec. 6, 2004 (GB) .................................. 0426736.5

(51) Int. Cl.
*G06F 9/44* (2006.01)
(52) U.S. Cl.
USPC ....................................................... 717/106
(58) Field of Classification Search
USPC .................. 717/101–103, 106–109, 171–172
See application file for complete search history.

(56) References Cited

U.S. PATENT DOCUMENTS

| 5,668,992 | A | 9/1997 | Hammer et al. | 395/651 |
|---|---|---|---|---|
| 6,467,088 | B1 | 10/2002 | Alsafadi et al. | 717/173 |
| 6,701,521 | B1 | 3/2004 | McLlroy et al. | 717/173 |
| 7,275,243 | B2 * | 9/2007 | Gibbons et al. | 717/159 |
| 7,779,405 | B2 * | 8/2010 | Gorti | 717/172 |
| 2002/0032754 | A1 | 3/2002 | Logston et al. | 709/219 |
| 2002/0131404 | A1 | 9/2002 | Mehta et al. | 370/352 |
| 2003/0110239 | A1 | 6/2003 | Sugumoto et al. | |

FOREIGN PATENT DOCUMENTS

| JP | 2002-055826 A | 2/2002 |
|---|---|---|
| JP | 2003-173261 A | 6/2003 |
| WO | WO 03/083688 A1 | 10/2003 |

OTHER PUBLICATIONS

Grundy et al., "An architecture for building multi-device thin-client web user interfaces", 2002, CiteSeerX , 4 pages.*
Grundy et al., "Developing Adaptable User Interfaces for Component-based Systems Issues and Experiences", 2001, CiteSeerX, 13 pages.*

(Continued)

*Primary Examiner* — Ted T Vo
(74) *Attorney, Agent, or Firm* — Saul Ewing LLP

(57) ABSTRACT

A customized software application can be built for a specific type of Wireless Computing Device by (a) automatically determining attributes of that type of Wireless Computing Device; (b) automatically determining which Software Components from a library of Software Components are compatible with that type of Wireless Computing Device based on values of the attributes determined in (a); and (c) automatically combining the compatible Software Components together to generate a customized build of the application, compatible for that type of Wireless Computing Device. The attributes can be metadata. This approach enables rich Network Applications to be automatically built for Wireless Computing Devices of a wide variety of types.

25 Claims, 1 Drawing Sheet

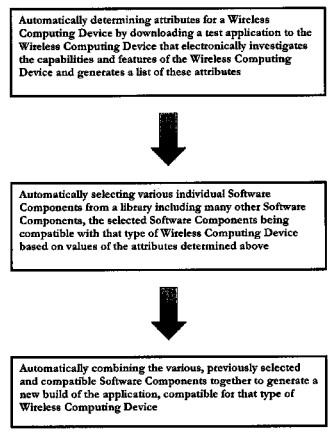

(56) References Cited

OTHER PUBLICATIONS

Grundy et al., "Building multi-device, adaptive thin-client web user interfaces with Extended Java Server Pages", 2002, Wiley, 15 pages.*

"Large-Scale, Component-Based Development" Alan W. Brown, Publisher: Prentice Hall PTR, First Edition May 30, 2000, ISBN: 0-13-088720-X, 320 pages.

"Linkers & Loaders" John R. Levine. Publisher: Morgan Kaufmann (2000), ISBN: 9781558604964.

"Software Engineering with Reusable Components" Johannes Sametinger. Publisher: Springer, Berlin; (Mar. 3, 1997). 272 pages. ISBN-10: 3540626956. ISBN-13: 978-3540626954.

* cited by examiner

Automatically determining attributes for a Wireless Computing Device by downloading a test application to the Wireless Computing Device that electronically investigates the capabilities and features of the Wireless Computing Device and generates a list of these attributes

Automatically selecting various individual Software Components from a library including many other Software Components, the selected Software Components being compatible with that type of Wireless Computing Device based on values of the attributes determined above

Automatically combining the various, previously selected and compatible Software Components together to generate a new build of the application, compatible for that type of Wireless Computing Device

METHOD OF AUTOMATICALLY BUILDING A CUSTOMISED SOFTWARE APPLICATION FOR A SPECIFIC TYPE OF WIRELESS COMPUTING DEVICE

CROSS REFERENCE TO RELATED APPLICATIONS

This application claims the priority of PCT/GB2005/004675 filed on Dec. 6, 2005 and GB 0426736.5 filed on Dec. 6, 2004, the entire contents of which are hereby incorporated in total by reference.

BACKGROUND OF THE INVENTION

1. Field of the Invention

This invention relates to a method of automatically building a customised software application for a specific type of wireless computing device. It provides a way to rapidly and efficiently deploy functionally rich network-centric applications to the largest number of wireless computing devices.

2. Definitions

The definitions used in this specification are as follows:

Mobile Telephone: A type of telephone which is connected to the telephone network via wireless technology through the air rather than through a physical wire or other physical connection or form of cable.

Mobile Phone, Phone, Mobile, Mobile Handset or Handset: A type of Mobile Telephone.

Mobile Network: A network which provides wireless connectivity for Mobile Telephones so that they can operate and provide functions such as making telephone calls or accessing network-resident data or services.

Mobile Network Operator (MNO): A company or organisation which operates a Mobile Network and the subscribers or users who use Mobile Telephones on that network.

Global Mobile Network or Mobile Phone Network: The sum of all Mobile Networks operated by Mobile Network Operators in the world.

Wireless Network: A network which provides wireless connectivity to client computing devices. Such a network includes Wi-Fi, WIMAX and the Global Mobile Network.

Server: A networked computing device which exists to provide networked application services, features and functions such as information supply, database search and transactions to one or more client computing devices which make connection to it and make requests for services from it. There are generally many clients to each server and each client is usually of a smaller size and of smaller computing capability than the server.

Services: The networked computing services, features and functions which are typically provided by a Server to one or more network connected client computing devices. Services include information supply, database search and transactions. Such services are architecturally practical to deploy centrally in the network and typically impractical to deploy on a client computer due to the client's size and power.

Client: A computing device connected to a network delivering the features and functions of a network-centric application to the user or consumer of the application. The Client typically connects to a Server and requests Services.

Network Application: A type of application or service that is network-centric, in that it is delivered by a combination of software running on a Client performing the function of the application's interface to the end user or consumer, supported and complemented by Services provided by software on a Server which are accessed by the Client over a network.

Wireless Computing Device: A type of Client which connects to the network via a Wireless Network. Such devices include Mobile Telephones, Personal Digital Assistants (PDAs), Games Consoles (e.g. Sony PSP) or other wirelessly network connected client computing devices. The type of the Wireless Computing Device is further defined by it's Manufacturer, Make, Version, Operating System, Firmware Version.

Wireless Device or Wireless Client: A type of Wireless Computing Device.

Software Application The Client software application which is to be delivered over-the-air to, or pre-installed on, the Wireless Computing Device.

Software Components Individual units of software which form the components of the Software Application which is being customised for the Wireless Computer Device and part of the Device Adaptive Architecture (DAA) software library.

Mobile Content: Digital files and data representing electronic products used by, consumed, played, viewed or rendered on Mobile Phones. Examples include ringtones/ring tunes, wallpapers/pictures, screensavers/animations, realtones/truetones, full music downloads, video, SMS & MMS alerts, mobile games, and many other current and emerging Mobile Phone consumable entertainment and information products.

Metadata: Individual items of data or collections of data, potentially hierarchically related, which describe the attributes or behaviour of Wireless Computing Devices, Wireless Networks, Software Components, Network Applications or Mobile Content.

3. Description of the Prior Art

At the time of writing there are more Mobile Telephones in the world than there are personal computers (PCs). The nature of a Mobile Telephone is that it generally spends more time switched on and in it's owner's presence than a PC. These Handsets are increasingly powerful computers with rich functions and capable hardware which, given that they are connected to the world's vast Mobile Networks and through these to the Internet, provide a very compelling platform to deliver a significant number of Network Applications to their users.

The Global Mobile Network is one of the first examples of a network where a vast number of Wireless Computing Devices with widely different operating systems and platforms are connected to the network and can deliver Network Applications. The PC dominated Internet network differs significantly from the Global Mobile Network because there are a much smaller number of Client operating systems and platform variants. Even though the Clients on the Internet are extremely powerful computing devices they are predominantly similar to each other given the dominance of a small number of operating systems from companies such as Microsoft and Apple. The effect of this is that if one builds the Client component of a Network Application for the PC Internet on just Microsoft Windows, or perhaps the next one or two most prevalent Client architectures, then one can deploy a similarly behaving Network Application across a very high percentage of existing devices and therefore have a technically and potentially commercially viable product. Moreover in the PC Internet world it is possible to target similar groups of users very effectively by choosing to build the Client part of a Network Application using a particular operating system or platform. For example if one were to build a Network Application for Financial Directors of companies the vast majority of these could be supported by building Client software compatible with Microsoft Windows.

The same is not true of the Global Mobile Network. There are very many more Wireless Client operating systems and platform variants than exist on the PC Internet. As a consequence of this and also because of the extremely fast rate of development of functional enhancements and feature additions to Mobile Phones, the devices vary a lot more in their behaviour as do the operating systems and platforms used to access and control this behaviour. In addition to this it is not feasible to identify and target a group of users by their role who use the same or very similar Wireless Devices.

Generally speaking, the more Wireless Clients a Network Application can operate on, the greater the financial opportunity for the provider of the application as more customers can be reached. For this reason it is particularly interesting to providers of such Network Applications to be able to deploy software on the most Clients possible.

Network Applications and services are commonplace in the networked PC world, and represent very big business opportunities due to the size of the Internet and thus the potential number of users. There are a small number of ways in which the software implementing the Client part of an application is currently architected. These are as follows:

1. 'Custom Built Applications'

End user computer devices (e.g. PCs) which can act as Clients to a Network Application generally provide a platform on which software programs can be run. These platforms are typically the computer's operating system (e.g. Microsoft Windows, Linux, Mac OS, Unix, etc) or a platform layer on top of the operating system which allows software programs to be run (e.g. Java). Custom Built Applications are built from software which can be run on one of these platforms. The software in the application makes calls to the platform and the platform in turn performs a service for the application (e.g. drawing a window or sending information across the network).

These platforms typically have a very rich set of features which are available to the Custom Built Application, in fact they normally offer all the features and facilities of the computer. As such Custom Built Applications can provide very rich user interfaces, wide-ranging functionality and can normally do anything that the Client is capable of Examples of such applications (though not so network focused) are the well known Microsoft Office tools such as Word, Excel and PowerPoint.

Due to the dominance of PC platforms, such as Microsoft Windows, it is possible to develop a Custom Built Application and have it run successfully on many of the world's PCs. However, if the application is required to run on more than one platform a port of the application is required to that platform or if the platform is significantly different a full rewrite of the application is required. Porting and rewriting applications is a very significant and costly engineering exercise, the effort required increases with each additional feature in the application.

In summary, Custom Built Applications provide the richest possible feature set and best interface for the end user experience but these applications are only viable on a relatively small number of platforms due to the engineering effort required to port from one platform to another.

The problem with this approach is that it cannot run on a new Client platform unless the Client part of the Network Application has been fully ported to the new Client platform. This is fine in the PC world where there is little requirement to port applications and in any case there are few Client platforms and very few new Client platforms, but the Global Mobile Network presents an problem of immense complexity by comparison with its myriad existing operating systems and types of Wireless Device and a constant flow of new Client devices coming into the market at an unprecedented rate.

2. 'World Wide Web Applications'

The World Wide Web (WWW was originally designed as a network-based inter-document referencing and navigation system which allowed users to browse between links from one document to another potentially on different machines, potentially on different sides of the world. This technology was facilitated by a standard mark-up language in which documents were written, called hyper-text mark-up language (HTML), and the HTML browser. HTML browsers are software applications which run on a user's Client displaying HTML documents and allowing navigation between documents using HTML hyper-text links.

The technology became very popular because HTML browsers were soon written for most client computers. This meant that all networked computer users had access to the same ever extending world-wide library of information and documents. It also meant that people who wished to publish information need only mark-up the document once in HTML to have it accessible by the vast majority of networked computers in the world.

As time went on, users demanded more and more from this WWW technology and many more features were added. New features included the ability to add small amounts of software embedded into the pages being displayed (applets and scripts) which in turn allowed more functional applications to be built taking advantage of more of the Client's capabilities. Other features included forms for data collection and submission across the network of data collected to software Services resident on Servers.

The end result was that quite capable Network Applications could be deployed on a WWW Server and the vast majority of the world's Client computers using browsers were able to access and operate the application. This represented an opposite extreme to the Custom Built Application in that although WWW Applications could not be used to build an application as functionality rich on the Client, it would however run on the majority of the world's PC Client computers without having to be ported to each different platform.

The compromise inherent in this type of WWW Application is that the HTML browser is the platform through which the Client part of the Network Application accesses the capabilities of the Client. However the HTML browser has access to significantly less features and commonly significantly less powerful features of the Client operating system. In consequence the range of features which can be implemented in a WWW Application are fewer and less rich than a Custom Built Application. In addition because HTML is a standard to be commonly interpreted by all HTML browsers, the features available to a WWW Application are the features which are common to all Client platforms. This presents a problem in the Wireless Mobile Network where the features of Mobile Clients are evolving so rapidly that not only are they not common but it is desirable to deploy Network Applications which use features that are not common across different Wireless Devices including the newest features.

There are methods by which WWW Applications can deploy richer features and more advanced Client specific application code, for example by embedding Microsoft ActiveX or Java code. This has the effect of making the application a combination of a WWW Application and a Custom Built Application or a WWW Application and a Write Once, Run Anywhere Application (depending on the nature of the embedded code) and have the combined issues and limitations of two of these types of application.

3. 'Write Once, Run Anywhere Applications'

Write Once, Run Anywhere Applications are meant to provide the best features from the worlds of Custom Built Applications and WWW Applications. As their name suggests, the application is defined only once yet the same consistent and functionally rich application will run on many platforms without having to port the application. This is achieved in one of two ways:

i) 'Virtual Machines'

A Virtual Machine is an intermediary software platform which sits on a Client's own platform (e.g. operating system) and runs the Write Once, Run Anywhere Application. This is achieved because the application software is able to be read line by line by the Virtual Machine and the instructions are interpreted on-the-fly into corresponding native calls to the Client's platform.

The end result of this approach is that if a Virtual Machine is written for every significant Client platform then one is able to develop a single computer program compatible with the Virtual Machine which can produce a user experience much functionally richer than a WWW Application (as there is access to more of the Client's platform features) without having to port the application to each Client platform. An example of this technology is Sun Microsystems Java.

The problem with this approach is that if the Client software has any internal complexity (e.g. is scientific in nature, makes use of software threads, has near-real-time graphics or any other real-time properties) then a like performance of the application becomes much more difficult to ensure across multiple different types of Clients. This is the reason that a mobile Java Game never runs on all Java Clients but only a small subset which has been specifically tested by the originator of the game to ensure that the user experience remains the same. This is why programmers often say "Write Once, Debug Everywhere". This problem can never be obviated using the Virtual Machine technique.

ii) 'Pseudo Code Compilers'

Pseudo Code Compilers achieve a similar outcome using a different method. Similar to Virtual Machines, the software representing the application is written once and is represented in a high level form which can be interpreted by other software. However rather than deploying a Virtual Machine platform on every target Client which interprets the application code on-the-fly, before the application code is sent to the Client a compiler reads through the application and builds (compiles) a native application which will run directly on the Client's operating system platform.

This way a single representation of a rich featured application can be developed and it can be run on any Client for which a compiler exists. An example of such a system is Sybase's PowerBuilder (which incidentally can also implement a version of the Virtual Machine architecture using it's 'P-Code' technology).

The problem with both these approaches are identical to that of Custom Built Applications, except that in these cases it is the compiler or the interpreter which must be re-written for every target Client platform. Similarly, that presents no great problem in the PC world where there are few operating systems but it presents an almost insurmountable hurdle in the Mobile Network world where you cannot deliver an application unless you can first deliver the compiler or the interpreter. It's an inescapable catch-22.

In summary of these three methods, PC Network Applications can be developed as:

Custom Built Applications if you want rich features and functions but only want it to run on a small number of types of Client platform, or WWW Applications if you want to define them once, have them run everywhere but are happy to live with a limited user experience, or Write Once, Run Anywhere Applications if you want to define them once and have them run on many platforms.

In the world of Mobile Phones the environment is significantly different. The major differences are as follows:

There are many more Mobile Devices in use connected to many different Mobile Networks.

There are significantly more manufacturers of Mobile Phones each with potentially multiple Client platforms resulting in many more varieties of Client platforms on which applications need to run.

The capabilities of Mobile Phones change very rapidly as more and more features are added. The end result is that two different Mobile Phones can have very different capabilities, quite unlike PC Clients which tend to be very similar.

In order to maximise the financial potential of a Network Application delivered using Mobile Phone technology the requirements are:

Enable the application to run on as many Mobile Devices as possible;

Enable the application to be rapidly commissioned onto new Phones as they are released;

Enable the application to take advantage of the best and most appropriate features of each Mobile Device, as opposed to just running the same application definition everywhere.

Most of the world's Mobile Phones do have a Wireless Application Protocol (WAP) or eXtended HTML (xHTML) browser installed. These browsers and associated document based mark-up languages are directly comparable to the architecture of the WWW Application. Using this Mobile Phone technology it is possible to develop a Network Application which will run on nearly all the world's Handsets. The problem is that, similar to the restrictions of WWW Applications, WAP & xHTML can only utilise a very small subset of each Mobile Phone's capabilities. It is not possible to develop the most functionally rich user experience using these technologies as they don't have access to the most advanced features of the Phone.

A significant proportion of Mobile Phones now come with a Client platform onto which applications can be deployed. Most significantly these include Java (or Java 2 Mobile Edition—J2ME), Symbian and Brew. Java is the most widely adopted of these technologies but, like Symbian and Brew, applications built with the technology still have serious issues and limitations. There are nearly two billion instances of thousands of different types of Phones on hundreds of different Mobile Networks. This presents the Java platform and Client application building in general with the following problems:

Different Phones have different versions of Java.

Different Phones have different Java bugs.

Different Phones have different parts of the Java platform implemented.

Every Phone has many different releases of operating system and firmware which means there are behavioural differences on Phones of the same type of a different age.

The same Phone can exist with several identities (for example, MNO branded version of Phones).

Every Phone has different physical characteristics like screen size, number of pixels, colour depth, keyboard controls, soft-key characteristics etc.

Every Phone has different computing capabilities like processor speed and memory size.

Every Phone has a different set of media files and formats that can be shown via Java (e.g. audio, pictures, video, animations, etc). Sometimes these are different from the formats that the Phone lets the user use in native Phone applications, such as setting a screen wallpaper.

Every Phone has different software limitations (two Phones may have the same amount of memory but they allow an application to use different amounts).

Every Phone has a different set of media files and formats that the Phone's operating system can handle and these are potentially different from those that can be handled by Java or the platform which runs the application on the Phone.

Phones handle their network connection in many different ways, the technologies are different, the settings are different, the user prompts are different, the way settings are sent and handled by the Phone are different, the way connections are managed can be different.

Different Phones have different networking capabilities and handling (e.g. CSD, GPRS, 2G, 2.5G, 3G, WAP, SMS, Bluetooth, Infrared, Wi-Fi, WiMAX etc)

This means that although software language consolidation platforms like Java can be available on a very large proportion of the world's Phones and provide a useful programming language for deploying applications that can use the advanced features of a Phone to produce a rich user experience, in practice every different Phone requires a custom built application to navigate and alleviate their many differences.

There is no previously existing technology, platform or method that has ever had to meet the challenge of rapidly and efficiently delivering the most functionally rich applications to the most Wireless Computing Devices optimised for each device.

Because all Phones differ in these ways to some degree the only way to deliver an application using the most advanced features of each Phone to the most Phones is to deliver a custom built application for each different Handset. If one used a traditional approach to this problem, whichever approach was used, the net result would be an inordinate and unmanageable amount of porting. This would end up with a new "stream" of code used to build the application for each new Phone. This is very expensive and maintenance becomes more and more difficult the more streams of source code you add. The net result is that it is prohibitively expensive to build an application where the source code for the application has been tuned for each device. It's clear that a new approach is needed.

SUMMARY OF THE INVENTION

A customised software application can be built for a specific type of Wireless Computing Device by (a) automatically determining attributes of that type of Wireless Computing Device; (b) automatically determining which Software Components from a library of Software Components are compatible with that type of Wireless Computing Device based on values of the attributes determined in (a); and (c) automatically combining the compatible Software Components together to generate a customised build of the application, compatible for that type of Wireless Computing Device. The attributes can be metadata.

This approach enables rich Network Applications to be automatically built for Wireless Computing Devices of a wide variety of types. The implementation of this invention called the Device Adaptive Architecture (DAA) satisfies the requirements to maximise the utility and financial potential of delivering Software Applications to Wireless Computing Devices using Mobile Phone technology because it:

Enables the Software Application to run on as many Mobile Devices as possible;

Enables the Software Application to be rapidly commissioned onto new Phones as they are released;

Enables the Software Application to take advantage of the best and most appropriate features of each Mobile Device, as opposed to just running the same Software Application definition everywhere.

BRIEF SUMMARY OF THE DRAWINGS

FIG. 1 is a flowchart illustrating the steps of the present invention.

Further details and aspects are defined in the appended Claims.

DETAILED DESCRIPTION

The present invention will be described with reference to the Device Adaptive Architecture implementation. The principles of the DAA solution to the challenge of building a platform for deploying the most functionally rich Network Applications to the largest number of Wireless Client Devices in the most efficient manner are:

Every Handset needs a unique application to maximise the user experience.

The differences between Phones capabilities and features are described and hence represented predominantly in Metadata, not in software. Examples of the Metadata collected for each Handset during the Handset commissioning process can be found in Appendix 1—Handset Metadata. Examples are also provided of how this Metadata varies from device to device.

The reference point for the differences between each phone is the Metadata used to represent that Phone (see Appendix 1—Handset Metadata). Even though this Metadata is eventually utilised to choose individual Software Components which are used to form the Software Application, the reference point is the Metadata for that Phone as the Software Application can be deleted and rebuilt.

The Software Application for a particular Handset is built automatically by the Device Adaptive Architecture software using on the one hand the Metadata used to describe the unique capabilities and idiosyncrasies of the device (see Appendix 1—Handset Metadata), and on the other hand the Metadata used to describe a library of Software Components that can be compiled dynamically into an application suitable for that device (see Appendix 2—Handset Software Component Library). The Software Component library is full of small software components, as opposed to larger less granular units. Each Software Component could be selected to form part of the Software Application based on the Metadata describing the function and method of configuring each Software Component and the Metadata describing the attributes of the device. See Appendix 3—Examples of Mapping Handset Metadata to Software Components.

A rapid method by which the Metadata describing the unique nature of each Handset, used to build the customised Software Application for that Handset, can be added to the platform. If a Handset is commissioned using a combination of existing Software Components without any modification required then that is achieved by configuring the Handset Metadata alone. If new or existing software code needs engineering then new or existing Software Components with associated descriptive Metadata will be added or altered in the library.

A rapid method by which new or existing Software Components can be added to or modified in the library when a Handset is discovered which implements functionality using methods and technologies which are not yet available in the library. A new or modified Software Component can be quickly added by placing the new file containing the software in the file system of the library. This is supplemented by Metadata describing the conditions in which the Software Component is used or the way in which it is configured for use inside the build of a Software Application.

An additional Metadata and mark-up syntax on top of this which allows many different Network Applications to be deployed to this newly supported Handset with the minimum amount of Handset specific software developed. See Appendix 4—End User Application Metadata and Mark-up.

The ability to update the Software Application dynamically on the Phone after install.

The ability for the Client to report its status and key parameters to the Server to allow for further user specific tuning. For example the Software Application can run tests to determine the Client's current available persistent and dynamic heap memory space available which could influence the size of any deck updates made to the Client's Software Application so as to avoid overrunning maximum memory size permitted.

The archiving of every unique instance of the Software Application.

The first thing to do to support a new Handset is to acquire the Handset for the purposes of commissioning. A simple generic test application is downloaded to the Handset which identifies the core packages available on the Handset platform. Using this information a test application aligned with the Handset's capabilities is dynamically selected. This test application is downloaded to the Handset to electronically investigate the capabilities and features of the Handset and also include tests of historic bugs which were found on other Phones. This test application accumulates the results of it's tests as a set of Metadata representing many of the Phone's attributes and idiosyncrasies. This Metadata is then written into a data store and related to that type and build of Phone (see Appendix 1—Handset Metadata).

Manual inspection and testing of the various Handset capabilities and idiosyncrasies is then carried out, the results of which are similarly stored in the data store against the Handset supplementing the initial data set from the test application. Once all information has been retrieved and all initial tests completed there is enough data to potentially use the platform to build a custom built Software Application for this new Handset.

Various other Handset specific information which is not used in the build of the Software Application for that Handset is also collected. This information is collected for use in systems supporting the operation of Software Applications built for this Handset. For example the location of where network settings are stored on a particular Handset is recorded so that the user can be helped with Handset specific guidance at the appropriate point in the application. See 'User Assistance Properties' in Appendix 1—Handset Metadata.

At the heart of the Device Adaptive Architecture (DAA) is the engine which dynamically builds a Software Application for each Handset, or potentially Handset/Mobile Network combination. The DAA reads the Metadata representing the capabilities of a Handset then cross-references these capabilities with the Metadata describing the capabilities and configuration options of the Software Components in the library, see Appendix 3—Examples of Mapping Handset Metadata to Software Components. The DAA then combines the selected Software Components configured in the manner required into a Client Software Application custom generated for that Handset and potentially Mobile Network combination.

This then represents a Software Application customised for this particular Handset which is actually a platform for executing applications rather than a functional end user application itself. In other words this exercise has dynamically and automatically built an application execution platform which is downloaded to the Handset and requires an application, itself defined in Metadata, to actually implement an end user application or service, see Appendix 4—End User Application Metadata and Mark-up. This Metadata describing the application is then added to the generated application execution platform software and the end result is a software program which when installed and run on the Handset implements the end user application.

Each time an Software Application is built for a particular Handset an instance of this application is stored in the archive of builds. The archive contains 100s of different builds for each version of the Software Application as an historic record. Historical builds can also be reproduced at anytime by simply re-running the DAA's dynamic build process using the Handset Metadata and the Software Component versions and associated Metadata valid at that time.

This candidate Software Application build then goes through a human based system testing process to confirm that the application operates correctly on the new Handset. This sometimes results in full success, sometimes it results in a requirement to change the Handset Metadata, rebuild the application and retest and sometimes it results in some of the Software Components having to go into engineering for maintenance or new Software Components to be built followed by rebuild of the application and subsequent retest. Ultimately a fully functioning Software Application is available for this Handset and when it has passed the system test it is then promoted to the production system for live use by end users.

The particular Mobile Network to which a Handset is connected can also influence the build of the application for that Handset. Understanding MNOs and their network configurations in detail is just as important to the DAA as understanding the Handsets in detail, so that the correct build for an MNO can be delivered to the Handset if required. See Appendix 5—Network Operator Metadata for details.

When a user's device connects to the system to request the download of a Software Application over the network the Handset informs the system of its User Agent Profile (UAProf). This describes the phone manufacturer, model and firmware. Sometimes the Software Application required by a Handset has to also be customised to the Mobile Network on which the user is connected, sometimes even the payment contract they have with the MNO (e.g. pre-pay or monthly contract). In this situation the Mobile Network on which the Handset is connected is detected either by the MNO information found inside the requesting SMS, the route the SMS came through, the IP address of the MNO gateway through which the request is being made, via an MNO core network lookup (e.g. SS7/HLR if available), Phone number (MSISDN) lookup against MNO number range assignments and ported number databases or by simply asking the user in the screens prior to download. The system uses the most reliable method made available to it. The UAProf, potentially combined with details of the MNO and payment contract type, is the key to choosing the correct, previously generated application to be presented for download by the connected Handset.

For the purposes of implementing end user billing or end user tracking, and potentially end user support, it is important to be able to uniquely and separately identify every instance of a Software Application downloaded by every Handset and the Mobile Telephone Number (MSISDN) of the Handset which that Software Application instance is installed on. In order to do this the DAA builds a unique reference number into the Software Application before or at the time of the download. This reference number is related in the Server data store to the user's MSISDN which was acquired from the end user whilst they were requesting the Software Application (e.g. from the SMS requesting the application or the MSISDN collected on the web form, etc). When the now Client-resident Software Application subsequently makes a request for Services from the Server it automatically provides the unique Software Application instance ID. Should the MSISDN be required then the unique instance ID can be used to look it up.

We have discussed how a Software Application automatically generated by the DAA is custom built for each Mobile Telephone as identified by manufacturer, device type and potentially firmware (embedded device software) version or Mobile Network to which the device is connected. When a device connects to the Server for the purpose of acquiring a Software Application the Server determines these variable attributes and selects the application appropriate for this Phone.

However there are significant commercial opportunities associated with having such Software Applications pre-installed on users' Phones such that they are present on the Mobile Device at the time users acquire their Handset.

There are typically two places where applications can be pre-installed on a Mobile Phone before the user acquires the Phone. The first is in the manufacturing of the device by its vendor (or manufacturing subcontractors). The second is at a device configuring/provisioning facility in the supply chain to the end user (either a Mobile Phone distributor or retailer).

In either of these situations the Mobile Phone is, or can be, at some point connected to equipment which provisions (controls the setup of) the Mobile Telephone. At this point our systems interface with that provisioning equipment such that it has access to versions of any Software Application which is to be pre-installed on the Handset.

In this way the appropriate Software Application will be made available to the provisioning equipment to enable it to be placed on the Mobile Device. However since the application installed on the Handset might not be able to access the MSISDN of the Mobile Phone, this is different to providing an unique Software Application to every single device with an inbuilt unique instance ID reference inside the application which can be transmitted back to the server and there related to the user's MSISDN for the purpose of billing (for example). Instead the application will be common to all Mobile Phones which share the same vendor, model, firmware and potentially Mobile Network to which they are/will be connected. Therefore this relationship to MSISDN needs to be made retrospectively after the Software Application has been installed on the Mobile Phone. This is done as follows:

1. The Software Application specific to the Mobile Phone/Network combination is pre-installed on the Phone by interfacing with the Mobile Telephone provisioning equipment and supplying it with all the Software Application builds it needs and the vendor/model/firmware/network information relating to each Software Application version so that the correct one can be chosen and installed;
2. The Mobile Phone is acquired by an end user;
3. The end user turns on the device, discovers the Software Application and starts it;
4. When the Software Application connects to the Server it describes itself as a pre-installed application (by making a request with no associated application instance ID) and presents the information relating to the attributes which were used in the selection of this Software Application for this device (e.g. phone vendor/model/firmware/network).
5. This information is enough to allow the Server to create an instance record, with an associated unique ID, for this Software Application and to assign this unique reference to this instance of the Software Application. The unique ID is passed back to the Software Application over the network and the application stores this ID locally and presents it on all subsequent Server Service requests (just as if it had been built into the Software Application in the first place).
6. The Server is also able to determine, from the data initially presented above, what the appropriate content types are for this device so that content applications can deliver the correct type and format of Mobile Content for the Handset.
7. The end user can thus use all parts of the Software Application that are available without the system requiring the phone's MSISDN.
8. If the user accesses part of a Software Application that requires the MSISDN and the MSISDN is accessible to the Software Application, then it is read and sent to the Server as part of the request for the Service. It will then be written into the database of the Server where it will be related to the application reference ID. It will therefore not be required to be sent from the Software Application again.
9. If the user accesses part of a Software Application that requires the MSISDN and the MSISDN is not accessible to the Software Application then depending on the capabilities of the Software Application in combination with the Handset the following will happen:
   a) If the Handset provides the Software Application with the ability to send an SMS, then an SMS will be sent to the Server containing the unique instance ID of the Software Application. This SMS is received by the Server and enables the Server to associate the unique application instance ID with the MSISDN it determined from the incoming SMS.
   b) If the method the Software Application uses to connect to the Mobile Network allows the forwarding of the MSISDN to the Server (e.g. via special modems which place the connecting MSISDN on the request headers, or via MNO communications gateways which can provide the MSISDN in the header of the communication) then this can be used by the Server to detect the MSISDN and have the association made between the MSISDN and the application instance ID in the Server's database.
   c) If neither a) nor b) is available then the Software Application has to ask the user to manually enter their MSISDN into the application's user interface. This is then done and sent to the Server. The Server can then associate this Software Application's MSISDN with the application's unique instance ID. If this method is used there might be an extra step taken by the Server to ensure security or MSISDN accuracy such as sending back to the entered MSISDN a PIN number which the user needs to enter into the Software Application to unlock any purchasing features.

Software Applications built using this Device Adaptive Architecture appear very responsive to the end user. The reason for this is that the Metadata and mark-up language used to define the end user application (see Appendix 4—End User Application Metadata and Mark-up) is stored locally on the Client in the Software Application as data. This means that the application execution platform generated for this Client by the DAA uses this local resource to run the end user application and thus the speedy appearance.

Software Applications which display lists of content such as news or ringtones can utilise this facility to cache their content structures inside the end user application Metadata definition. This means that when the application is run by the end user it will appear very fast because it doesn't need to connect to the Server to access the list of content.

The Client Software Application is able to request an update to any element of the Metadata representing the end user application, meaning that the application is completely updatable over-the-air. This ranges from a simple request to update a list of content in one menu, a request to update all the content in the end user application or to update the entire definition of the end user application itself, effectively potentially changing the entire nature of the Software Application.

The end user application is packaged in data files or decks that define the menus, sub-menus, look & feel elements, screens layouts and any content references in the application. Screens are defined in XML using XML references to resources and content in those screens. The screen definitions are stored with the content and presentation resources and converted to binary for packing with the Software Application. Decks can be referred to from other decks. If the deck referred to is required but is not on the Client it will be requested from the Server. Each deck is loaded from a data stream that is either a file stored in the Software Application, a record stored in local memory or a file streamed from the Server.

Each deck or item in a deck has an optional expiry date such that it can be expired and a fresh version downloaded from the Server instead of the local deck being used. This is effective for implementing features like charts or daily changing news. Whenever a user uses part of an end user application that utilises a deck where an expiration date is set and passed, the update mechanism from the Server runs.

There are different types of deck used to store different data depending on the frequency of expected update, and the space available in each location on the Handset. Items in a more dynamic deck can override those in a less dynamic deck. (For example configuration in the system deck stored in the application can be superseded by later changes applied to the deck streamed from the Server).

The Server also has the ability to override any deck in the application, this can be performed when a Software Application makes a connection to the Server. This effects Server push end user application refreshing or updating. The Server will provide an update to the element by referencing the element on the Client and providing the new element.

Where a Software Application connects to the Server via the network to download a resource and there is a wait whilst that resource is downloaded, the Client application can display animations and progress bars. The animations are for the purpose of providing some entertainment for the eyes and reducing the perceived wait. The progress bar provides some indication of the progress. Where there are no animation libraries on the Client platform these libraries are provided in the Software Application. They are built using the ability of the Client platform to deploy using X/Y coordinates full or partial pictures to parts of the Client's screen. When combined with timing between these image plots the affect is one of animation.

Included as part of the Metadata recorded against Handsets and Mobile Networks is information pertaining to the appropriate network connection settings for a particular Mobile Network, the mechanism for delivering these network settings over-the-air to a Handset and the likelihood of whether that Handset/MNO combination is likely to require settings.

Using this information the platform is able to automatically attempt to provision communications settings to the Handset when it appears that they are not present or offer the end user to opportunity to initiate sending settings to themselves. It can also provide instructions on any additional manual configuration that the settings require from the end user once they have been delivered.

All requests made by the Client Software Application to the Server are recorded in an audit trail on the Server. All actions on the Client Software Application marked in the end user application Metadata definition as requiring tracking are communicated to the Server for the similar purposes of recording in the audit trail. This means that very sophisticated customer relationship management can be effected because of the rich data collected about customer usage. For example this very rich usage data can be viewed as a set of system operations key performance indicators.

All errors in the Client application are recorded by the Client Software Application and passed to the Server at the next opportunity when the Client successfully communicates with the Server. This allows for a detailed picture to be built up of how the Client Software Application is performing in the general Handset populace, and can be used to look for trends in any sensitivities Handsets present. This information can also be used to identify specific newly released Handset firmware versions which have introduced a bug which needs handling with an adjustment of the Handset Metadata.

The system includes a full service management suite of graphical tools which allows Omnifone's partners to manage their own systems. These tools are windows on the various configurable Metadata controlling an end user application. Simply by changing the Metadata elements of the service, e.g. application flow or content structure, the nature of the application can be changed.

All interaction between the Client and the Server are recorded and the system therefore knows the entire volume of data traffic passing between the Client and Server. This is relevant when network data usage has a cost associated and we can work out what the usage level has been and subsequently what the costs should be given that we have a total number of bytes transmitted to and from the Server by any Software Application.

The Server monitors for the use of new Phones against the system that have not yet been seen by the system. If a new Handset attempts to download a Software Application but the platform cannot find a match, the system will notify the System Administrator. In addition a count will be kept of requests from each device like this so that the System Administrator can see which devices are the most important to commission next based on number of potential users.

The Server implements a 'Send to a Friend' feature that can be easily added to a Client Software Application. When used, it displays a Send to a Friend option on the Handset's menu. When selected the user can enter a friend's MSISDN, sometimes via their Phone's address book if allowed, and an optional greeting. The utility tells the Server to send the application to the specified friend. This is done using a technique like WAP push or MMS.

The Software Application allows the display of advertising messages broadcast to the user base of an existing end user application allowing all or a subset of users to be targeted for receiving advertising messages via the Software Application. The advertising message is a message which is delivered as a Server push and is splashed on the appropriate screens. This is facilitated by the flexibility described as available to the Server for changing the end user application by effecting a Server push.

DAA is not just appropriate to delivering applications to Mobile Phones (or indeed Wireless Computing Devices). It is appropriate to situations where an application is required to be built for and delivered to a large number of Client computing devices (including non-Wireless Client computing devices), where:

- The application required is similar for all devices;
- There are many differences between many of the devices but they are fundamentally similar and the differences between the Clients can be described in Metadata and used by the Device Adaptive Architecture to build the application;
- The application to be deployed benefits from being able to understand the differences between devices and provides the best possible functionality and features for the each device;
- The application should be described/represented once or as few times as possible and the Metadata representing the device characteristics is used to build the custom applications required by each device rather than the differences required by the application for each device being described in each version of the application arrived at by a traditional porting exercise.

Appendix 1—Handset Metadata

This section contains details of the type of Metadata collected for each Handset during the Handset commissioning phase. The Metadata is grouped logically and described. Various examples are provided of how the values of the Metadata can vary from device to device.

The Metadata collected to enable the commissioning of a Handset and the subsequent delivery of a rich application to Handsets is subject to constant change. This is due to new features and functions being released in Handsets and the consequential need to continually evolve the Metadata collected from the Handsets.

Device Identification

| | |
|---|---|
| manufacturer | Which company designs and manufacturers the device. E.g. Nokia, Sony Ericsson, etc |
| name | Name of the device e.g. 6600, K700i |
| display_name | How customers know the phone e.g. Nokia 6600, Sony Ericsson K700i. |
| user_agent_expression | User Agent Profile (UA Prof) presented during a WPA or xHTML session during application download used to recognise a phone. |
| user_agent_evaluation_priority | Handling conflicts between UA Profiles. |
| group_membership | Used to group handsets which have a similar platform together. |
| 3$^{rd}$ party handset identifiers | How others might refer to handsets e.g. content suppliers or MNOs. |
| phone image | A picture of the phone. |

Market Information

| | |
|---|---|
| popularity rating | A sliding scale of popularity used to determine which handsets to commission. |
| launch date | The date that the handset became available in the market. |
| announcement date | The date that the handset was announced to the world. |

Network Configuration

| | |
|---|---|
| notification_method | Available methods for delivering URLs to the phone e.g. plain text, WAP push |
| network_settings_type | Protocol for sending settings to phone e.g. OMA, OTA |
| can_send_browser_settings | Supports receiving browser settings (Y/N) |
| can_send_java_settings | Supports receiving Java midlet settings (Y/N) |
| device.properties.network.settings.named.java.session | Ability to control name of settings sent to phone |
| device.properties.settings.additional.config.required | Additional manual configuration required from user to set up network settings (Y/N) |
| device.properties.settings.can.configure.manually | Network settings can be manually configured by the user |
| device.properties.wap.browser.content-type | Protocol used by WAP browser (xHTML/WML) |

Physical Characteristics

| | |
|---|---|
| Screen size (characters) | Number of characters displayable on screen. |
| Midlet screen size (pixels) | Java addressable screen size. |
| Full screen size (pixels) | X & Y pixels for screen size (Y/N) |
| Dynamic memory available | |
| Application size limitations | Limitations to the size of the application. |
| device.properties.recordstore.max-record-size | Persistent memory (Recordstore) record size |
| device.properties.recordstore.max-size | Persistent memory (Recordstore) maximum available |

Network Configuration

| | |
|---|---|
| explicit_java_settings | Separate Java settings required (Y/N) |
| defaults_to_wap | Java will use browser's settings |
| configuration_complexity | User interaction complexity rating |

Media/Content Capabilities

Media content types supported by Java e.g. audio types, pictures types and size, etc.
Media content types supported by phone e.g. audio types, pictures types and size, etc.
Media content type limitations for Java (image size, max number of channels, max file size, specific form of content type, such as MMF version, image file type, etc)
Media content type limitations for phone (image size, max number of channels, max file size, specific form of content type, such as MMF version, image file type, etc)

HTTP Connection

| | |
|---|---|
| browser_protocol | WAP browser protocol for HTTP communications |
| java_protocol | Java midlet protocol for HTTP communications |
| device.build.properties.connection.concurrent | Handles concurrent connections |
| device.build.properties.connection.primer | Connection needs priming |
| device.build.properties.connection.primer.reverse.first.connection | Type of connection priming required |
| device.properties.http.primer.delay.after | Delay to user after first priming connection |
| device.properties.http.primer.delay.before | Delay to use before first priming connection |
| device.properties.connection.apn-choice | Prompts user to select from a list of APNs on connection |
| device.properties.connection.max-threads | Maximum threads supporting concurrent connections |
| device.properties.connection.one-wap-profile | |
| device.properties.connection.platform-request.http.fails.after | Browser launched from midlet will fail to connect if attempted after Java connection |
| device.properties.connection.platform-request.http.fails.before | Browser launched from midlet will fail to connect |
| device.properties.connection.platform-request.http.gateway | Gateway used to open browser from Java. Will either be the browser's gateway or the Java gateway |
| device.properties.connection.refuse.session | Whether midlet can reconnect after user has refused the connection. |
| device.properties.connection.timeout | Force timeout on connection (don't rely on phone to do it reliably) |
| device.build.http.headers.no-cookies | Whether phone supports cookies |

SMS Communications

| | |
|---|---|
| device.build.properties.sms.port.required | Phone requires specific configuration for outbound SMS communication |
| device.build.sms.truncated | Handle handset specific bug that some phones have with sending truncated SMS. |

Java APIs & Libraries

| | |
|---|---|
| device.packages.btapi.1.0 | BTAPI version |
| device.packages.cldc.1.0 | CLDC version |
| device.packages.cldc.1.1 | CLDC version |
| device.packages.com.samsung.util.audioclip | Samsung audio library available |
| device.packages.com.vodafone.v10 | Vodafone audio library available |
| device.packages.midp.1.0 | MIDP 1.0 |
| device.packages.midp.2.0 | MIDP 2.0 |
| device.packages.mmapi.1.0 | MMAPI version |
| device.packages.wma.1.0 | WMA version |
| device.build.properties.audio.incapable | No audio library available |
| device.properties.jad.attribute.midxlet.api | Vendor specific control of JAD contents |
| device.properties.jad.attribute.midxlet.network | Vendor specific control of JAD contents |
| device.properties.jad.attribute.rms.size | Vendor specific control of JAD contents |

Java Application Security

| | |
|---|---|
| device.properties.jad.attribute.signed.required | Application signing |
| device.properties.jad.attribute.signing.keystore.name | Application signing authority and mechanism required |

User Interface Capabilities

| | |
|---|---|
| device.build.screen.canvas.limitation | Manage memory limitation on some phones |
| device.build.screen.canvas.refresh | Handle problems with refresh parts of the screen on some phones |
| device.build.screen.command.select | |
| device.build.screen.items.pool | Handle memory management problems some phones have with creating and clearing up display objects. |
| device.properties.progress.connect.range | Gauge behaviour |
| device.properties.progress.download.range | Gauge behaviour |

Miscellaneous Capabilities

| | |
|---|---|
| device.build.system.explicit.garbage.collection | Give hints to JVM to help it with memory management. Used on lower memory phones. |
| device.build.history.reference | Manage memory limitation on some phones |
| device.build.image.unreliable.creation | Phone-specific runtime bug workaround |
| device.properties.jad.static | Handle JAD naming restrictions on some phones |
| device.properties.preview.png.dimensions | Handle handset specific bug with displaying some images |

User Assistance Properties

Properties used for providing user assistance throughout the platform.

| | |
|---|---|
| help.install.bookmark.create.how | How to bookmark a WAP page |
| help.install.java.how | How to install a Java midlet |
| help.install.java.location.how | How to find a Java midlet |
| help.install.java.location.where | Where to find a Java midlet |
| help.install.java.outmemory.how | How to deal with out of memory errors |
| help.install.java.upgrade.how | How to upgrade a Java midlet |
| help.install.sms.location.how | How to find a plain text SMS |
| help.install.sms.location.where | Where to find a plain text SMS |
| help.install.sms.use.how | How to use a URL in a plain text SMS |
| help.install.smsbookmark.create.how | How to create a bookmark from a SMS URL |
| help.install.wsi.location.how | How to find a WAP Push |
| help.install.wsi.location.where | Where to find a WAP Push |
| help.install.wsi.use.how | How to use a WAP Push |
| help.settings.gprs.enable.how | How to enable GPRS |
| help.settings.java.activate.how | How to active sent Java network settings |
| help.settings.java.save.how | How to save sent network settings |
| help.settings.wap.activate.how | How to activate sent WAP network settings |
| help.settings.wap.overwrite.how | How to overwrite existing WAP settings |
| help.settings.wap.save.how | How to save sent WAP network settings |
| help.usage.bookmark.find.how | How to find a bookmark |
| help.usage.content.game.how | How to use a game |
| help.usage.content.game.location.how | How to find a game |

| | |
|---|---|
| help.usage.content.game.location.where | Where to find a game |
| help.usage.content.realtone.how | How to use a realtone |
| help.usage.content.realtone.location.how | How to find a realtone |
| help.usage.content.realtone.location.where | Where to find a realtone |
| help.usage.content.ringtone.how | How to use a ringtone |
| help.usage.content.ringtone.location.how | How to find a ringtone |
| help.usage.content.ringtone.location.where | Where to find a ringtone |
| help.usage.content.texttone.how | How to use a texttone |
| help.usage.content.texttone.location.how | How to find a texttone |
| help.usage.content.wallpaper.how | Where to find a texttone |
| help.usage.content.wallpaper.location.how | How to use a wallpaper |
| help.usage.content.wallpaper.location.where | How to find a wallpaper |
| help.usage.java.browser.how | Where to find a wallpaper |
| help.usage.java.easy.location.how | How to make it easy to find a midlet |
| help.usage.wap.easy.location.how | How to make it easy to find a WAP bookmark |

Appendix 2—Handset Software Component Library

This appendix lists the type and nature of Software Components in the library which are utilised by the Device Adaptive Architecture to select from in the build of an application for a handset. These components are constantly changing due to the constant evolution of Handsets and the subsequent requirement for new and modified Software Components.

Core Components
Core handset components are listed below:
Audio Player Component
Animation Component
String Display Component
Image Display Component
List Display Component
Gauge Component
TextField Component
HTTP Communication Component
Browser opening Component
SMS Sending Component
Command (soft key) options Component
GZIP Component
Memory Persistence (RMS) Component
Video Player Component
File Persistence Component
Checkbox Component
Radio button Component
SMS Receiving Component
Bluetooth Communications Component
Component Variants
Each component has several variants. Typical examples are shown below:
   Audio Player Component Variants—Always one of the following:
      No Audio Player
      "Standard" MMAPI Audio Player
      Samsung Audio Player
      VSCL (Vodafone) Audio Player
      Siemens Audio Player
   HTTP Communications Variants—Any combination of the following:
      "Standard"
      User Identifier in Cookie/User Identifier in URL
      Expected unreliable connection
      Handle concurrent connections
   SMS Sender Variants:
      With port number/Without port number on request
      "Standard" WMA
      Siemens SMS Variant
      Samsung SMS Variant
      With message padding/Without message padding (handling device specific bugs)
   Browser open Variants:
      Can't open WAP from Java
      Can only open wap from java if we haven't tested the java http connection
      Can open wap from java but requires java http settings
      Can open wap from java using the wap settings
Sub-Components
Each component/component variant has several Sub-Components which can be controlled by different properties. Examples are shown below:
   Audio Player Component
      Create Audio Player with suitable content/content-type component
      Start Audio Player component
      Stop Audio Player component
      Detect End of Playing Audio component
      Destroy Audio Player component
   HTTP Communications Component
      Create URL component
      Create HTTP headers component
      Create connection component
      Make HTTP request component
      Detect HTTP status component
      Retry HTTP component
   SMS Sender Component
      Create SMS object component
      Create SMS connection component
      Send SMS component
   Memory Persistence (RMS)
      Create record
      Read record
      Update record
      Delete record
      Split record
      Join record
   Animation Component
      Display animation
      Size animation
      Prioritise animation
      Animation rate
   Command (soft key) Sub-Components
      Open screen in JAR
      Open screen stored in RMS
      Open screen in current deck
      Download deck over HTTP and open screen
      Send SMS
      Open URL in WAP browser

Appendix 3—Examples of Mapping of Handset Metadata to Software Components

Any of the Software Components in the library can be associated with any number of device properties. The association with a property may be based on any of the following tests:

A direct property existence test (e.g. property A must exist for this Software Component to be compatible or used).

A comparative property value test (e.g. property B must have a value greater than X for this Software Component to be used)

A comparative test of a device property value against a Software Component property value. (e.g. device property C must have a value less than Software Component property SC for this Software Component to be used)

Ratings mechanisms which allow the most suitable of a set of compatible Software Component to be selected (e.g. where more than one Software Component is compatible, select which is the best fit for purpose by selecting that Software Component where the component attribute SC has the greatest value)

Any combination of the above

Some examples of how these properties are mapped to library Software Component are given in this section.

Build

Audio Player Component

Select audio package to include and use based on setting of the device's properties whose names match the wildcard "device.package.*"

If more than one audio package is supported by the device, then the package which offers support for the widest selection of audio types will be automatically selected. This decision is made by comparing the list of supported packages described by "device.packages.*" against the capabilities of each of the supported Audio Player Component Variants.

Exclude audio player component if phone does not support audio indicated by the device.build.properties.audio.incapable property Include "No preview available" components if no audio available HTTP Communication Component (Create Connection Sub-component)

Include additional connection (primer) request according to setting of device.build.properties.connection.primer property SMS Sender Component Construct SMS request according to device.build.properties.sms.port.required and device.build.sms.truncated properties Animation Component Use a form instead of canvas when resources are limited based on device properties: handset grouping, available dynamic memory.

Browser Opening Component

Include platform request sub-component only if functionality is supported on handset, indicated by existence of device.packages.midp.2.0 for device.

But exclude component if either device.properties.connection.platform-request.http.fails.after or device.properties.connection.platform-request.http.fails.before is set.

Tuning

Some Software Components, once included, are further tuned according to the value of device Metadata properties. For example:

HTTP Communication Component (Create Connection Sub-component)

Control sequence of primer connection attempt and main connection based on the values of device.properties.http.primer.delay.before and device.properties.http.primer.delay.after properties.

Control time delay between primer connection attempt and main connection attempt based on the values of device.properties.http.primer.delay.before and device.properties.http.primer.delay.after properties.

Switch the order of these according to device.build.properties.connection.primer.reverse.first.connection Animation Component Select correct sized animation according to which of a set of ranges the device's screen dimensions and available memory lie within.

Tune animation frame rate according to available resources described in properties: group membership, screen dimensions, available dynamic memory Tune animation thread priority according to available resources to balance animation smoothness against other processing happening on the handset. Controlled by examining properties: group membership, available dynamic memory.

Memory Persistence (RMS) Component

This component is tuned for the particular device by controlling the maximum size of individual records and also the number of records. This is controlled by handset properties device.properties.recordstore.max-recordsize and device.propeties.recordstore.max-size This allows data to be persisted via this Software Component without the application needing to know how the data is fragmented in the underlying storage. Data can be split over several records.

Appendix 4—End User Application Metadata and Mark-up

Provided below are examples of screen definitions for end-user applications built on top of the Device Adaptive Architecture. These examples show the three core types of screen—the form, the canvas and the list. These eXtended Mark-up Language (XML) descriptions describe the application screen in full, and show how the definition is used to control the presentation aspects of the screen, and control command-flow through the application. This is effectively the mechanism by which the Client part of a Wireless Client Network Application can be defined and built without writing software code.

Some of the specific features shown in these examples are:

Display and user interaction objects can be included

More sophisticated objects like Player and Images can be included and controlled Variables can be set and read.

Test conditions can be checked against variables

Full access is given to all attributes of the standard MIDP objects

Command buttons refer to other screens. Those screens will be already present on the client, or may have to be automatically loaded from the server.

FORM EXAMPLE

```
<form id="SearchFailure" title="Problem">
    <command label="OK" type="ok" priority="0" go="Index.do" />
    <command label="Back" go="${previous}" type="back" priority="1" />
    <string-item text="An error has occurred and the search can't be performed - the network might be busy. Please try again later." />
</form>
<canvas id="LoadingFriend" title="" interval="400">
    <command label="Cancel" go="${previous}" type="stop" priority="0" />
    <image-item key="midp.system.loading.image" src-deck="system" x="7" y="7" />
    <gauge x="64" y="98" size="small" />
    <string-item if="connect" since="1.3.1" text="Connecting." x="64" y="7" width="64" size="small" />
    <string-item unless="connect" text="Sending MyFone..." x="64" y="7" width="64" size="small" />
</canvas>
```

Canvas Example

```
<canvas id="Preview" title="Free Preview" interval="400" loopcount="1">
    <player src="/previews/17651" loopcount="1" contentType="audio/midi" />
    <image-item key="midp.system.loading.image" src-deck="system" x="7" y="7" />
    <string-item text="Free preview! Select the Buy option to buy this ringtone for GBP3.00." x="64" y="7" width="64" size="small" />
    <string-item text="Friends by TV Theme" x="7" y="98" width="114" size="small" />
    <command label="Back" go="${previous}" type="back" priority="1" />
    <command label="Buy" go="#Buy" type="ok" back="false" priority="0" />
    <command label="Play" go="#Preview" type="screen" back="false" priority="1" />
  - <command label="Terms" go="Index.do#Terms" type="screen" priority="9" back="false">
    <set var="last.card" val="Preview.do?id=2038#Preview" />
    </command>
</canvas>
```

List Example

```
<list id="Cat61" title="Music Celebs">
    <include id="#ProductList" />
    <set var="category.id" value="61" />
    <set var="category.name" value="Music Celebs" />
    <set var="topCategory.id" value="2" />
    <set var="topCategory.name" value="Wallpapers" />
    <append id="5496" text="Atomic Kitten 2" image="myfone/shared/icons/wallpaper.png" src-deck="system" />
    <append id="5500" text="Sugababes 1" image="myfone/shared/icons/wallpaper.png" src-deck="system" />
    <append id="5506" text="Ronan Keating 5" image="myfone/shared/icons/wallpaper.png" src-deck="system" />
    <append id="5520" text="Busted 1" image="myfone/shared/icons/wallpaper.png" src-deck="system" />
</list>
```

XML DTD

The following is a XML DTD (Document Type Definition) which describes the mark-up syntax available to use when building end-user applications.

```
<!--- Collection of related screens. -->
<!ELEMENT collection (list|form|canvas|template|initialize)*>
<!ATTLIST collection
    id CDATA #REQUIRED
    default CDATA #IMPLIED
    onConnectRefused CDATA #IMPLIED
    onConnectError CDATA #IMPLIED
    onLoad CDATA #IMPLIED
    onError CDATA #IMPLIED
>
<!--- Variables to set on initialization. -->
<!ELEMENT initialize (set)*>
<!--- A variable to set. -->
<!ELEMENT set EMPTY>
<!ATTLIST set
    var CDATA #REQUIRED
    val CDATA #REQUIRED
    scope (card|deck|session|rms) session
>
<!--- Template to include on other screens. -->
<!ELEMENT template (timer|string-item|gauge|image-item|command)*>
<!ATTLIST template
    id CDATA #REQUIRED
>
<!--- Command to run on user selection. -->
<!ELEMENT command (set|go)*>
<!ATTLIST command
    go CDATA #IMPLIED
    label CDATA #IMPLIED
    back (back) #IMPLIED
    priority NUMBER #IMPLIED
    type CDATA #IMPLIED
    onConnectRefused CDATA #IMPLIED
    onConnectError CDATA #IMPLIED
    onLoad CDATA #IMPLIED
    onError CDATA #IMPLIED
>
<!--- Screen to open. -->
<!ELEMENT go EMPTY>
<!ATTLIST go
    location CDATA #REQUIRED
```

-continued

```
    if CDATA #IMPLIED
    unless CDATA #IMPLIED
    refresh (refresh) #IMPLIED
    onConnectRefused CDATA #IMPLIED
    onLoad CDATA #IMPLIED
    onConnectError CDATA #IMPLIED
    onError CDATA #IMPLIED
>
<!--- Canvas screen. -->
<!ELEMENT canvas (timer|string-item|gauge|image-item|command)*>
<!ATTLIST canvas
    id CDATA #REQUIRED
    loopcount NUMBER #IMPLIED
    interval NUMBER #IMPLIED
>
<!--- Image to display. -->
<!ELEMENT image-item EMPTY>
<!ATTLIST image-item
    layout (default|left|right|center) default
    newline (before|after|none) none
    y CDATA #IMPLIED
    x CDATA #IMPLIED
    height CDATA #IMPLIED
    width CDATA #IMPLIED
    src-deck CDATA #IMPLIED
    key CDATA #IMPLIED
>
<!--- Player to initialize. -->
<!ELEMENT player EMPTY>
<!ATTLIST player
    src %URI; #REQUIRED
    contentType CDATA #IMPLIED
    loopcount NUMBER #IMPLIED
>
<!--- Connection gauge to display. -->
<!ELEMENT gauge EMPTY>
<!ATTLIST gauge
    size (default|small|large) default
    y CDATA #IMPLIED
    x CDATA #IMPLIED
    if CDATA #IMPLIED
    unless CDATA #IMPLIED
>
<!--- String to display. -->
<!ELEMENT string-item EMPTY>
<!ATTLIST string-item
    text CDATA #REQUIRED
    if CDATA #IMPLIED
    unless CDATA #IMPLIED
    frames NUMBER #IMPLIED
    frame NUMBER #IMPLIED
    align (default|left|right|center) #IMPLIED
    size (default|small|large) default
    width CDATA #IMPLIED
    y CDATA #IMPLIED
    x CDATA #IMPLIED
    since CDATA #IMPLIED
>
<!--- Form screen. -->
<!ELEMENT form (image-item|text-field|command|string-item|include)*>
<!ATTLIST form
    title CDATA #REQUIRED
>
<!--- Textfield for user to enter data. -->
<!ELEMENT text-field EMPTY>
<!ATTLIST text-field
    id CDATA #REQUIRED
    maxsize NUMBER #IMPLIED
    constraints (any|emailaddr|numeric|phonenumber|url|password) any
    label CDATA #IMPLIED
>
<!--- List screen. -->
<!ELEMENT list (set|include|append|itemCommand|command)*>
<!ATTLIST list
    title CDATA #REQUIRED
    id CDATA #REQUIRED
>
<!--- Item on a list that runs a command when selected. -->
<!ELEMENT itemCommand EMPTY>
<!ATTLIST itemCommand
    go CDATA #REQUIRED
    image CDATA #IMPLIED
    text CDATA #REQUIRED
    back (back) #IMPLIED
    onLoad CDATA #IMPLIED
    expires CDATA #IMPLIED
    src-deck CDATA #IMPLIED
>
<!--- Item on a list. -->
<!ELEMENT append EMPTY>
<!ATTLIST append
    id CDATA #REQUIRED
    text CDATA #REQUIRED
    src-deck CDATA #IMPLIED
    image CDATA #IMPLIED
>
<!--- Include a template on this screen. -->
<!ELEMENT include EMPTY>
<!ATTLIST include
    id CDATA #IMPLIED
>
<!--- Run command after time interval. -->
<!ELEMENT timer (go)*>
<!ATTLIST timer
    delay NUMBER #IMPLIED
    go CDATA #IMPLIED
>
```

Appendix 5—Network Operator Metadata

The key Metadata used within the system for adjusting behaviour and builds according to the capabilities of a particular user's MNO are listed below.

| | |
|---|---|
| name | Identification |
| display_name | Identification |
| operator_code | Identification |
| country | Identification |
| Company | Identification |
| walled_garden | GPRS openness |
| reliable_delivery_receipts | SMS system reliability on operator |
| parent_operator_id | For managing virtual operators (MVNOs) |
| supports_contract | Contract types offered |
| supports_payg | Contract types offered |
| supports_gprs_on_contract | Offers data connectivity |
| supports_gprs_on_payg | Offers data connectivity |
| contact_number_payg_from_mobile | Operator customer contact details |
| contact_number_contract_from_mobile | Operator customer contact details |
| contact_number_payg_from_other | Operator customer contact details |
| contact_number_contract_from_other | Operator customer contact details |
| typical_apn_names | Network typical names |

System behaviour must be adjusted to the capabilities of the Mobile Network gateway that the Handset application is communicating with. The DAA understands each MNO gateway through Metadata as set out below:

| | |
|---|---|
| name | Identification |
| proxy_ip | Gateway connection parameters |
| proxy_port | Proxy port |
| access_point | Access point naming |
| login_type | Type of login required |
| username | APN username |
| password | APN password |

| | |
|---|---|
| homepage | Homepage definition |
| protocol | Gateway communication protocol |
| contract_type | Contract types this gateway is used with |

The invention claimed is:

1. A computer-based method of building a customised software application for a specific type of Wireless Computing Device, the method comprising the computer-implemented steps of:
   (a) automatically determining attributes of that type of Wireless Computing Device by downloading a test application to the Wireless Computing Device that electronically investigates the capabilities and features of the Wireless Computing Device and generates a list of these attributes;
   (b) automatically selecting various individual Software Components from a library including many other Software Components, the selected Software Components being compatible with that type of Wireless Computing Device based on values of the attributes determined in (a), in which no individual Software Component constitutes the application, but instead many such Software Components must be selected in combination to form the complete application;
   (c) automatically combining the various, previously selected and compatible Software Components together to generate a new build of the application, compatible for that type of Wireless Computing Device.

2. The method of claim 1 in which the attributes of the Software Components are also determined and the step of determining which Software Components are compatible includes the step of comparing the values of the attributes of that type of Wireless Computing Device to the values of the attributes of the Software Components.

3. The method of claim 1 in which attributes for that type of Wireless Computing Device are defined as Metadata.

4. The method of claim 1 in which the attributes for different types of Wireless Computing Device are also defined as Metadata.

5. The method of claim 4 in which the method includes the further step of determining attributes of a Wireless Network, to which the device is connected, as Metadata.

6. The method of claim 5 in which the method includes the further step of determining attributes of combinations of different Wireless Networks and different types of Wireless Computing Devices as Metadata.

7. The method of claim 3 in which the attributes defined as metadata for different types of Wireless Computing Device define one or more of: device identification; market information; network configuration; physical characteristics; network configuration; media/content capabilities; HTTP connection; SMS communications; Java APIs and libraries; Java application security; user interface capabilities; user assistance properties.

8. The method of claim 5 in which the metadata attributes for the Wireless Network include one or more of the following: identification; openness; SMS system reliability; parent operator ID; contract types offered; data connectivity offered; customer contact details; typical network names.

9. The method of claim 1 in which the Software Components in the library are restricted in functionality so that appropriate components can be matched to any variant of any attribute of that type of Wireless Computing Device or Wireless Network to which that type of device can be connected or combination of the two.

10. The method of claim 1 in which each software component is referenced by Metadata describing the instances and conditions in which the component should be used as part of the customised build of the application.

11. The method of claim 10 including the step of automatically determining which Software Components are compatible with that type of Wireless Computing Device is achieved by automatically matching the Metadata of the Wireless Computing Device with the Metadata referencing each software component.

12. The method of claim 10 in which automatically determining which Software Components are compatible with that type of Wireless Computing Device is achieved by matching the Metadata of the Wireless Network attributes with the Metadata referencing each software component.

13. The method of claim 1 comprising the step of configuring the compatible Software Components depending on the Wireless Computing Device attributes.

14. The method of claim 1 in which the compatible Software Components in the library are compiled into the customised version of the software application.

15. The method of claim 14 in which further applications for that type of Wireless Computing Device can be customised for that specific type of Wireless Computing Device by using additional Metadata and mark-up syntax representing a new or different application and generating a new application for that Wireless Computing Device.

16. The method of claim 3 in which the Metadata attributes for that type of Wireless Computing Device are determined automatically by the test application downloaded to an example of that type of Mobile Telephone.

17. The method of claim 16 in which the Metadata attributes for that type of Wireless Computing Device are further determined by manual testing.

18. The method of claim 17 in which the Metadata attributes for the application generated for that type of Wireless Computing Device can be manually tested and tuned for that type of Wireless Computing Device.

19. The method of claim 1 in which the resultant customised build of the application is an application execution platform with an embedded application to run on the platform.

20. The method of claim 19 in which the application execution platform is combined with the definition of an application to result in an end-user application.

21. The method of claim 20 in which the end user application is defined in Metadata mark-up language.

22. The method of claim 21 in which the end user application can include executable software.

23. The method of claim 1 in which the specific type of the Wireless Computing Device is a function of the manufacturer, model and firmware deployed on that type of telephone.

24. The method of claim 23 in which the specific type of the Wireless Computing Device is a function also of the Mobile Network to which a given Wireless Computing Device is connected.

25. The method of claim 1 in which the customised applications are Network Applications selected from the group: mobile content portal (carrying editorial, news, ringtones, wallpapers and other types of Mobile Content), gambling, dating, banking, location based services, directories, gaming, chatting, peer-to-peer applications.

* * * * *